United States Patent
King

[11] Patent Number: 6,085,640
[45] Date of Patent: Jul. 11, 2000

[54] CARRIER FOR DEEP FAT FRYER

[75] Inventor: James D. King, Kettering, Ohio

[73] Assignee: Henny Penny Corporation, Eaton, Ohio

[21] Appl. No.: 09/431,054

[22] Filed: Nov. 1, 1999

Related U.S. Application Data

[60] Provisional application No. 60/112,952, Dec. 18, 1998.

[51] Int. Cl.[7] ............................. A47J 37/00; A47J 37/12
[52] U.S. Cl. ............................. 99/407; 99/336; 99/403; 99/448; 99/450; 211/181.1; 220/315; 220/318; 210/167; 210/DIG. 8
[58] Field of Search ..................... 99/330–336, 403–417, 99/448, 450, 427; 126/369, 391; 210/167, DIG. 8; 220/315, 318, 329; 292/257, 259 R; 426/523, 510, 507, 509, 462

[56] References Cited

U.S. PATENT DOCUMENTS

| | | |
|---|---|---|
| D. 206,549 | 12/1966 | Callender . |
| D. 412,642 | 8/1999 | King . |
| 1,266,912 | 5/1918 | Bradbury . |
| 1,284,454 | 11/1918 | Reinert et al. ............................. 99/336 |
| 1,377,983 | 5/1921 | Lamb ......................................... 99/336 |
| 2,506,305 | 5/1927 | Pitman . |
| 2,658,444 | 11/1953 | Maldonado . |
| 3,242,849 | 3/1966 | Wheeler . |
| 3,484,252 | 12/1969 | Wells . |
| 3,501,316 | 3/1970 | Guthrie . |
| 3,563,158 | 2/1971 | Omer . |
| 3,608,473 | 9/1971 | Kearne et al. . |
| 3,685,433 | 8/1972 | Cunningham . |
| 3,690,246 | 9/1972 | Guthrie, Sr. ........................... 99/410 X |
| 3,821,925 | 7/1974 | Moore ....................................... 99/327 |
| 3,827,344 | 8/1974 | Pratolongo ................................. 99/352 |
| 3,939,980 | 2/1976 | King . |
| 3,958,503 | 5/1976 | Moore . |
| 3,979,856 | 9/1976 | Belcher . |
| 4,287,818 | 9/1981 | Moore et al. . |
| 4,300,686 | 11/1981 | Leclerc et al. . |
| 4,489,646 | 12/1984 | Schmidt et al. . |
| 4,599,990 | 7/1986 | Fritzsche et al. . |
| 4,602,612 | 7/1986 | Schwizer . |
| 4,742,455 | 11/1988 | Tate et al. . |
| 4,803,916 | 2/1989 | Tacconi ..................................... 99/352 |
| 4,803,917 | 2/1989 | Barbieri ..................................... 99/356 |
| 4,930,408 | 6/1990 | King et al. ............................. 99/403 X |
| 4,945,893 | 8/1990 | Manchester . |
| 4,997,101 | 3/1991 | King et al. ............................... 99/407 |
| 5,191,829 | 3/1993 | Caffarella .................................. 99/352 |
| 5,243,894 | 9/1993 | Sakuma . |
| 5,313,876 | 5/1994 | Hilger et al. .............................. 99/330 |
| 5,347,917 | 9/1994 | Vezzani et al. ........................... 99/335 |
| 5,469,778 | 11/1995 | Prudhomme ............................. 99/336 |
| 5,635,234 | 6/1997 | Svenson . |
| 5,974,955 | 11/1999 | King et al. . |

*Primary Examiner*—Timothy Simone
*Attorney, Agent, or Firm*—Baker Botts L.L.P.

[57] ABSTRACT

A carrier for product trays of a fryer is disclosed. According to one embodiment, the carrier includes a first and a second upper horizontal support. The front portions of the upper horizontal supports are connected by a front stabilizing means, and a rear portion of the upper horizontal supports are connected by a rear stabilizing device. A rear vertical support extends downwardly from the rear of the carrier. At least one tray securing point is located on the rear vertical support and is adapted to detachably receive a product tray. The product tray may be placed in the carrier in from the side of the carrier or from an oblique angle to the carrier. In another embodiment, a carrier includes a first and second upper horizontal support. The front portions of the upper horizontal supports are connected by a front stabilizing device, and a rear portion of the upper horizontal supports are connected by a rear stabilizing device. A front vertical support extends downwardly from a front corner of the carrier, and a first and second rear vertical support extend downwardly from a the rear corners of the carrier. At least one tray support extends from the first rear vertical support to the front vertical support and to the second rear vertical support, and a product tray may be placed in the tray support of the carrier from the side of said carrier or from an oblique angle to the carrier.

11 Claims, 4 Drawing Sheets

CARRIER FOR DEEP FAT FRYER

This application claims priority from, and incorporates by reference, in its entirety, U.S. Provisional Patent Application No. 60/112,952, filed Dec. 18, 1998.

BACKGROUND OF THE INVENTION

1. Field of the Invention

The invention relates generally to a cooking vessel, such as a deep fat fryer. In particular, the present invention is directed to a tray carrier for a deep fat fryer.

2. Description of Related Art

A large capacity cooking apparatus or deep fat fryer may comprise a vat or cooking vessel of a sufficient size to receive a product tray carrier, in which a food product to be cooked is held. The carrier is submersed in a cooking substance, such as melted shortening or cooking oil, which is contained in the cooking vessel. The cooking vessel may be closed by a lid which makes a seal with an upper edge of the cooking vessel.

An example of a suitable deep fat fryer is disclosed in U.S. Pat. No. 4,930,408, which is herein incorporated by reference in its entirety. Referring to FIG. 1, fryer 100 is provided with a generally rectangular housing 102 having upper surface 104, housing 102 enclosing rectangular cooking vat 106, the open top 108 of which projects upwardly above upper surface 104 of housing 102. The top 108 of vat 106 is adapted to be closed by lid 110.

At its forward end, lid 110 mounts bail-shaped handle 112 by means of which lid 110 may be raised and lowered vertically relative to vat 106. In the alternative, handle 112 may be used to pivot lid 110 to a vertical position for cleaning purposes.

On its under surface, lid 110 is provided with hangers 114 adapted to detachably receive carrier 116, which has longitudinally extending support rods 118 lying at vertically spaced-apart intervals. Support rods 118 are positioned to receive the flanged side edges 120 of product trays 122. With this arrangement, the product trays 122 may be readily inserted in carrier 116 and seated on support rods 118 from the front of fryer 100.

In normal use, each of product trays 122 is filled with the food product to be cooked and then inserted into carrier 116. Product trays 122 may be of the same size normally used in a holding product or display cabinet. This allows product trays 122 to be transferred directly from fryer 100 to the cabinet without moving or disturbing the cooked food product. Carrier 116 may be readily removed from lid 110 for cleaning or other purposes.

Other known deep fat fryers are disclosed in U.S. Pat. No. 5,402,712, U.S. Design Pat. No. 336,007, and U.S. Design Pat. No. 351,966, all of which are incorporated by reference in their entireties.

Alternatively, a large capacity cooking apparatus may be of an open-well design. In such an open-well cooking apparatus, the lid of the cooking apparatus may be an open frame, permitting direct access to the cooking vessel and to the food products submersed therein. The frame may support a carrier as described above.

Regardless of the type of cooking apparatus it is used in, the carrier serves an important purpose. As discussed above, the carrier holds filled product trays, and is lowered into the cooking substance. Known carriers, shown in FIG. 1, typically have rails, slots, or rods for receiving the product trays on two opposing sides of the carrier. To place a product tray in the carrier, the operator approaches the carrier from the front, aligns the product tray with its respective slot in the carrier, and slides or places the product tray into the carrier.

Although this appears to be a simple process, it has several drawbacks. First, the act of aligning the product tray with the carrier may create a traffic flow obstruction in front of the fryer. This is because the operator is required to approach the carrier from its front in order to properly align the product tray with the carrier. As cooking environments become more compact, and there is less space in front of a fryer, this could cause disruption in personnel traffic, possibly resulting in safety hazards. Further, loaded product trays may be heavy, both with cooked and uncooked food product. This makes it more difficult to properly align the product tray with the carrier, and may therefore require repeated, time-consuming attempts. Finally, when a product tray is removed from the carrier, cooking substance and other debris may momentarily drip onto the floor, which may create a safety hazard to employees.

SUMMARY OF THE INVENTION

It is a technical advantage of the present invention that a carrier for a deep fat fryer that overcomes these and other shortcomings of the prior art is disclosed.

It is another technical advantage of the present invention that the disclosed carrier for a deep fat fryer makes it easier to load product trays in the carrier.

According to one embodiment of the present invention, a carrier for product trays of a fryer is disclosed. The carrier includes a first and a second upper horizontal support. The front portions of the upper horizontal supports are connected by a front stabilizing means, and a rear portion of the upper horizontal supports are connected by a rear stabilizing means. A rear vertical support extends downwardly from the rear of the carrier. At least one tray securing point is located on the rear vertical support and is adapted to detachably receive a product tray. The product tray may be placed in the carrier in from the side of the carrier or from an oblique angle to the carrier.

In another embodiment of the present invention, a carrier includes a first and second upper horizontal support. The front portions of the upper horizontal supports are connected by a front stabilizing means, and a rear portion of the upper horizontal supports are connected by a rear stabilizing means. A front vertical support extends downwardly from a front corner of the carrier, and a first and second rear vertical support extend downwardly from a the rear corners of the carrier. At least one tray support extends from the first rear vertical support to the front vertical support and to the second rear vertical support, and a product tray may be placed in the tray support of the carrier from the side of said carrier or from an oblique angle to the carrier. The tray supports may have a trapezoidal shape, or they may be rectangular in shape.

Other objects, features, and advantages will be apparent to persons of ordinary skill in the art in view of the following detailed description of preferred embodiments and the accompanying drawings.

BRIEF DESCRIPTION OF THE DRAWINGS

For a more complete understanding of the present invention, the needs satisfied thereby, and the features and advantages thereof, reference now is made to the following descriptions taken in connection with the accompanying drawings in which.

DETAILED DESCRIPTION OF PREFERRED EMBODIMENTS

Figure 2:
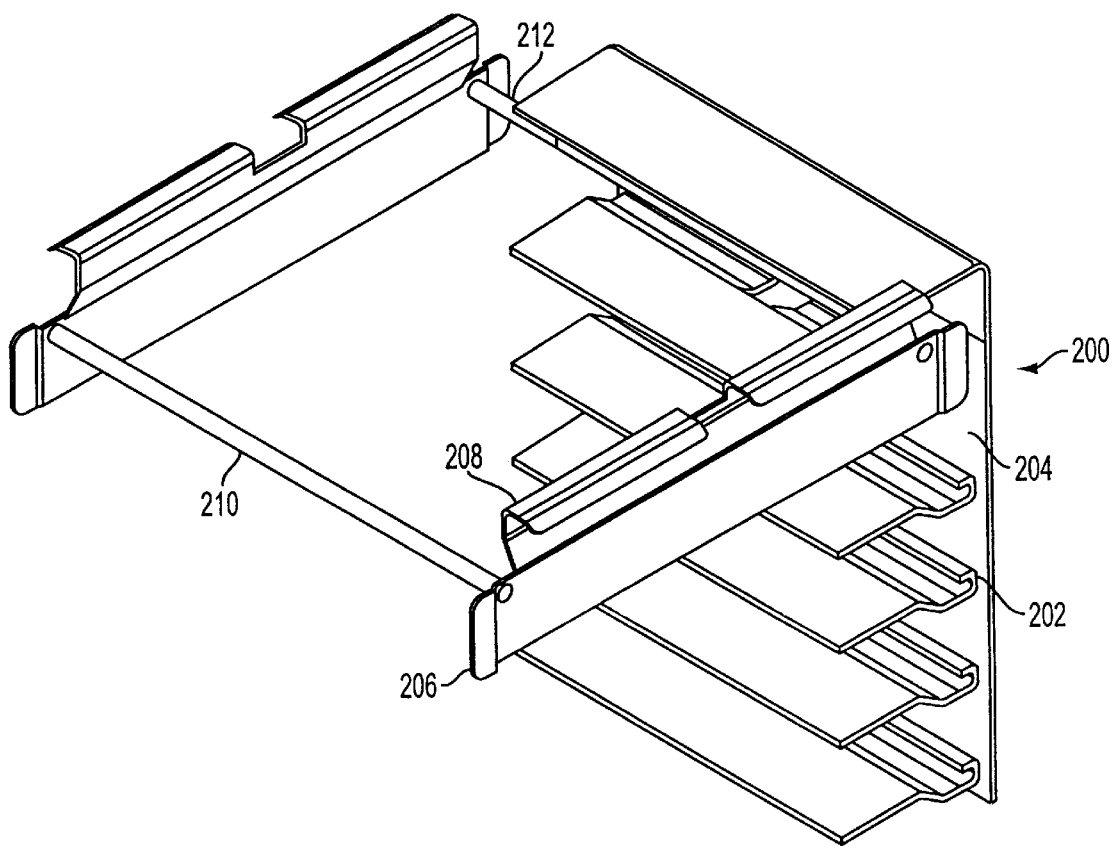
FIG. 2 is a perspective view of a carrier according to a first embodiment of the invention.
Figure 3:
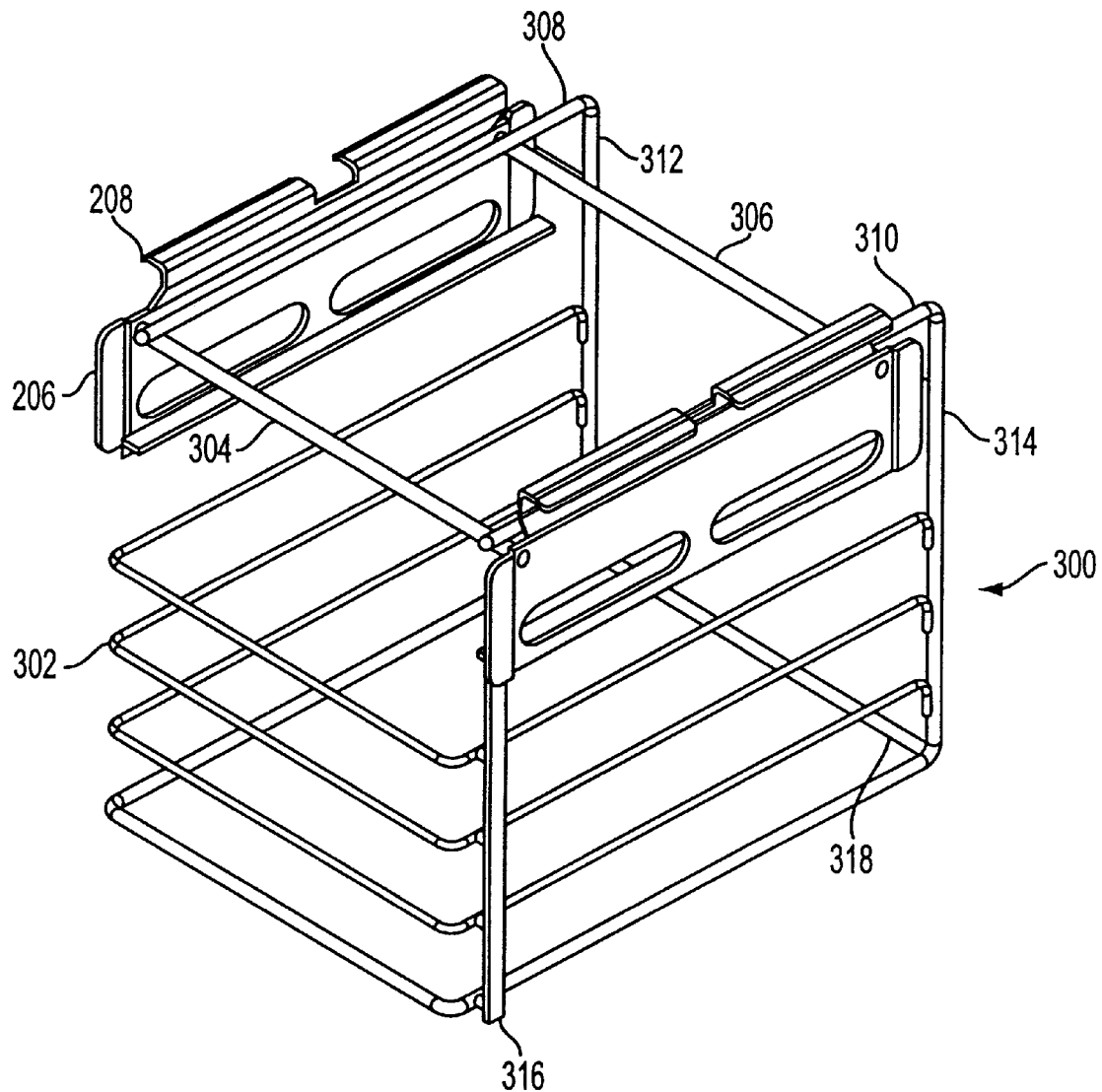
FIG. 3 is a perspective view of a carrier according to a second embodiment of the invention.
Figure 4:
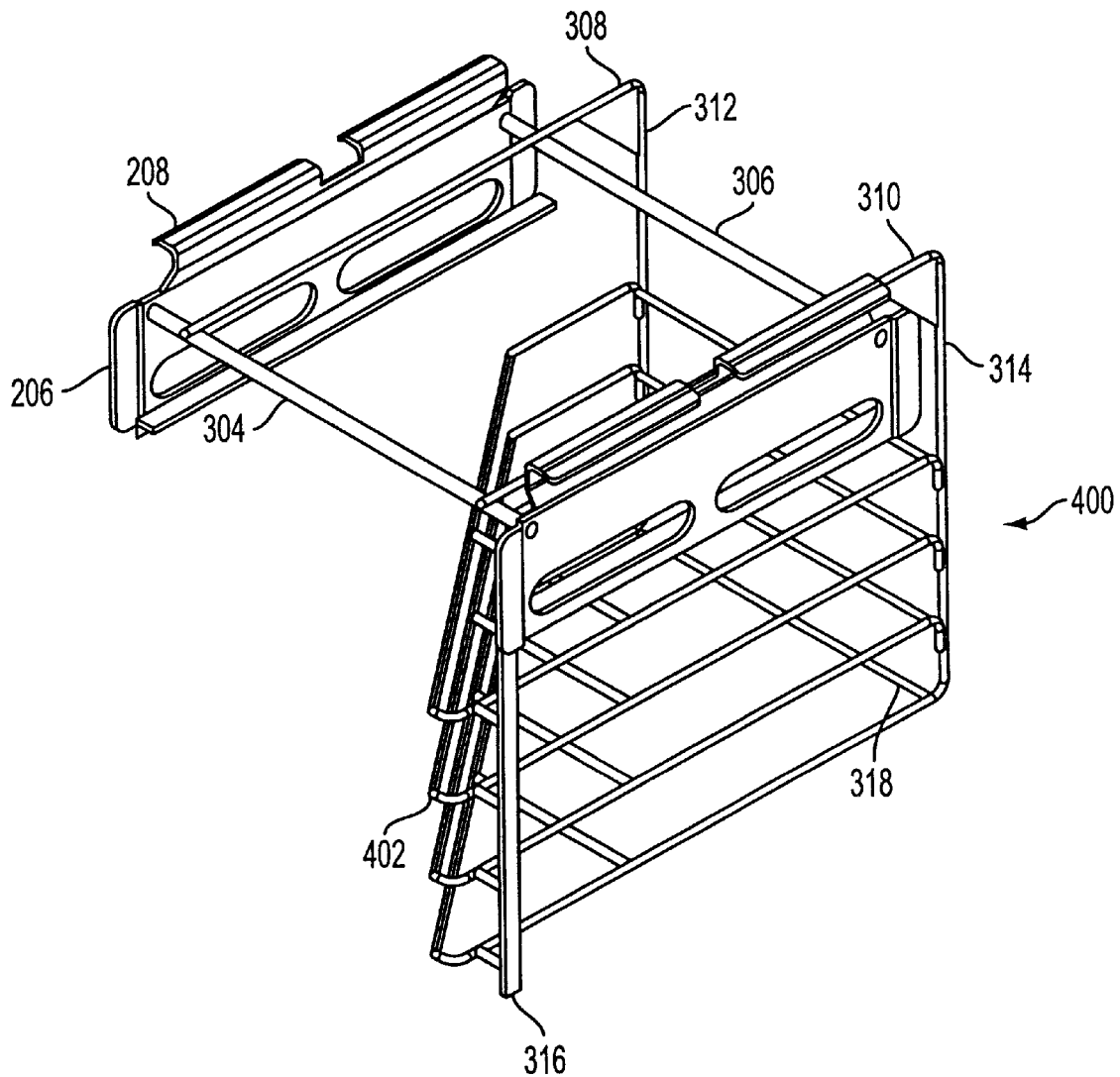
FIG. 4 is a perspective view of a carrier according to a third embodiment of the invention.

Preferred embodiments of the present invention and their advantages may be understood by referring to FIGS. 2–4, like numerals being used for like corresponding parts in the various drawings.

Figure 1:
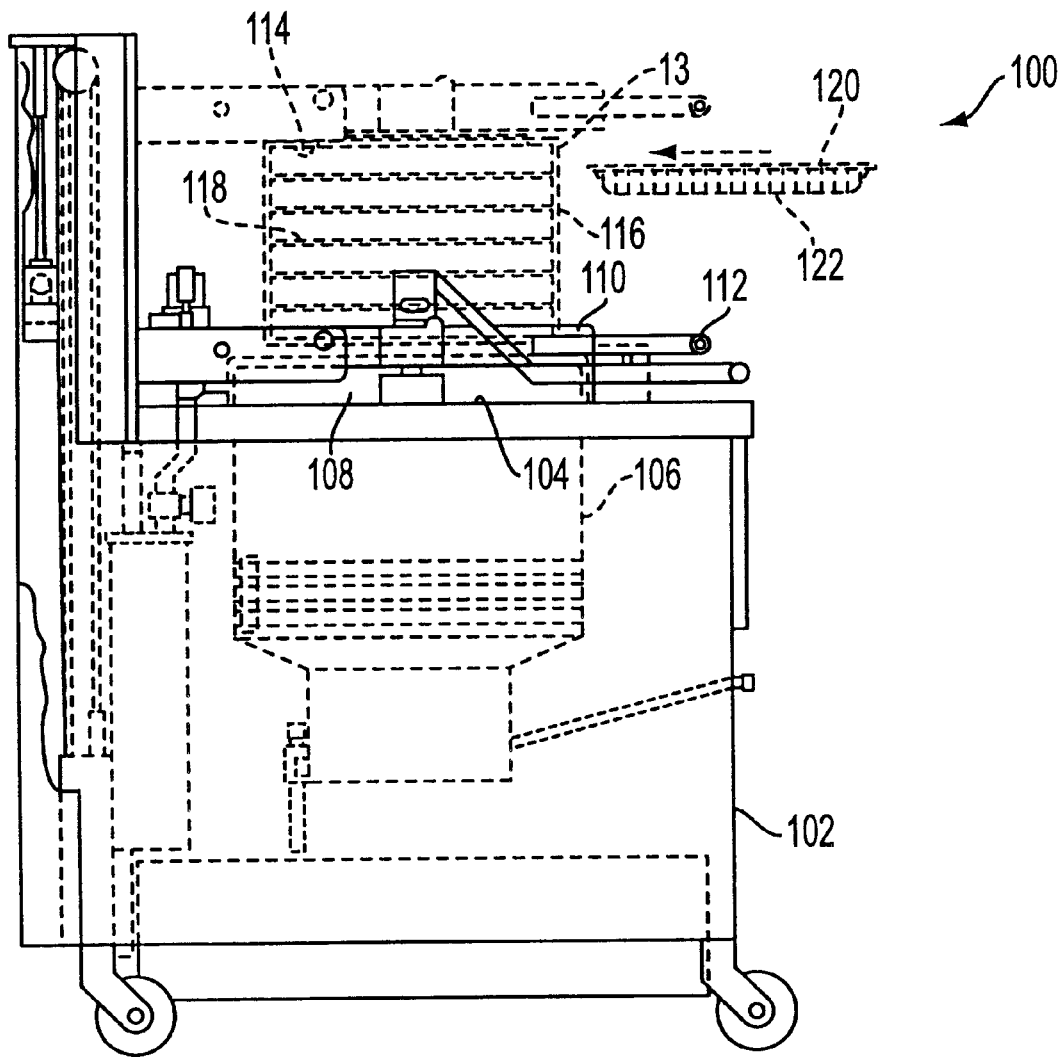
FIG. 1 is a side view of a known deep fat fryer with a known carrier design.

The carrier of the present invention is suitable for use in a cooking apparatus such as that described above with reference to FIG. 1. The carrier, however, may be used in a wide variety of cooking apparatuses.

Referring to FIG. 2, a perspective view of a carrier according to a first embodiment of the present invention is depicted. A lid (not shown) of a deep fat fryer detachably receives carrier 200. This may be accomplished by connecting means 208 which may be formed on side rails 206. Connecting means 208 may comprise hooks, hangers, or any other suitable means that detachably receives carrier 200. Known hangers, such as those described with reference to FIG. 1, may also be used.

Front stabilizing support 210 and rear stabilizing support 212 may be provided on the front and rear of carrier 200, respectively, and may connect side rails 206 to each other. Front stabilizing support 210 and rear stabilizing support 212 provide stabilize and reinforce carrier 200.

Back wall 204 may be formed on the rear of carrier 200, and may be connected to rear stabilizing bar 212. Back wall 204 may be solid, or it may provide holes, or passageways, through which the cooking substance may pass through. In an alternate embodiment, a first vertical support (not shown) and a second vertical support (not shown) extend downwardly from rear stabilizing bar 212 to form a frame in lieu of back wall 204.

Tray securing points 202 may be provided on back wall 204. The number of tray securing points 202 provided may depend on several factors, including, inter alia, the size of the fryer, the size of the product trays, the type of food substance that will be cooked, and any other relevant design parameters.

The configuration of tray securing points 202 may be chosen based on the size of the fryer, the estimated weight of the loaded product trays, or any other relevant parameter. In one embodiment, shown in FIG. 2, tray securing points 202 are about as long as the width of carrier 200. Tray securing points may be secured to back wall 204, or alternatively, tray securing points may be connected to any vertical support at the rear of carrier 200.

In another embodiment, tray securing points 202 may be discontinuous along the back of carrier 200. For each product tray, more than one tray securing point 202 may be provided. In this configuration, tray securing points may be secured to back wall 204.

Carrier 200 permits an operator to place a product tray (not shown) of food substance to be cooked in tray securing point 202. Due to the absence of horizontal slots, rods, or bars, the operator is no longer required to use a frontal approach when inserting a product tray into carrier 200.

Instead, an operator may use a side approach, an oblique approach, or any approach that results in the product tray being attached to the carrier. Once the initial contact with tray securing point 202 is made, the bulk of the weight of the product tray is supported by carrier 200, and the operator may make minor adjustments to the positioning of the product tray with significantly less effort.

After cooking, and after excess cooking substance is permitted to drip from the cooked food product, the operator may remove the product tray from carrier 200 from the side, obliquely, or in any desired direction once the product tray is detached from tray securing point 202. For instance, the operator may detach the product tray from tray securing point 202 and then remove the product tray from carrier 200 by moving it sideways. This may result in less likelihood of cooking substance or other debris dripping on the floor. Further, temporary holding racks may be provided on the sides of the fryer, which may allow the operator to move the product tray from carrier 200 to the holding rack with minimal effort.

Referring to FIG. 3, a perspective view of a carrier according to a second embodiment of the invention is depicted. In this embodiment, carrier 300 includes upper front support bar 304 and upper rear support bar 306. Support bars 304 and 306 connect first upper horizontal support 308 and second upper horizontal support 310. Additional support bars may be provided between upper horizontal support bars 308 and 310 as required.

First rear vertical support 312 and second rear vertical support 314 extend downwardly from upper horizontal supports 308 and 310. First rear vertical support 312 and second rear vertical support 314 may be connected by lower rear horizontal support 318.

Front vertical support 316 may be provided on a front corner of carrier 300. Front vertical support 316 may extend downward from an upper front corner of carrier 300. Front vertical support 316 may be provided on either side of carrier 300. In one embodiment, front vertical support 316 is positioned on the right side of carrier 300 in order to facilitate use by a left-handed person. In another embodiment, front vertical support 316 is positioned on the left side of carrier 300 in order to facilitate use by a right-handed person. Use of a particular embodiment, however, is not limited to a particular individual's hand preference.

Tray supports 302 are provided in carrier 300. Tray supports 302 may extend from first rear vertical support 312 to front vertical support to second rear vertical support 314. The number, spacing, and positioning of tray supports 302 depends on many factors, including, inter alia, the size of the fryer, the type of food product to be cooked, etc. Tray supports 302 may have many shapes, including a general U-shape, as shown in FIG. 3. In another embodiment, shown in FIG. 4, tray supports 402 have a general trapezoidal shape. Other shapes for tray supports, such as triangular shapes, may also be used. Tray supports 302 or 402 may be open or closed at the rear of carrier 300 or 400.

Carriers 300 and 400 allow an operator greater flexibility when placing a product tray on carrier supports 302 or 402. Product trays (not shown) may rest on tray supports 302 or 402. In another embodiment, product trays (not shown) may be suspended from tray supports 302 or 402. Product trays (not shown) may be placed or removed from tray support 302 or 402 from either the front of carrier 300 or 400 or the side of carrier 300 or 400. This provides the same advantages as discussed with regard to the embodiment shown in FIG. 2.

The carriers disclosed herein may be made of any known material suitable for use in deep fat fryers. Preferably, stainless steel may be used. Other materials, such as mild steel, may also be used. The materials may also be nickel plated.

While the invention has been described in connection with preferred embodiments and examples, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims.

What is claimed is:

1. A carrier for product trays of a fryer, comprising:
   a first upper horizontal support;
   a second upper horizontal support;
   a front stabilizing means connecting a front portion of said upper horizontal supports;
   a rear stabilizing means connecting a front portion of said upper horizontal supports;
   a rear vertical support extending downwardly from a rear of said carrier; and
   at least one tray securing point fixed to said rear vertical support, said tray securing point adapted to detachably receive a product tray;
   wherein said product tray may be placed in said carrier in from the side of said carrier or from an oblique angle to said carrier.

2. The carrier of claim 1, further comprising:
   connecting means formed on said side rails for detachably connecting said carrier to a lid of said fryer.

3. The carrier of claim 1, wherein said tray securing point is discontinuous.

4. The carrier of claim 1, wherein said rear vertical support comprises a back wall.

5. The carrier of claim 4, wherein said back wall has at least one open portion.

6. A carrier for product trays of a fryer, comprising:
   a first upper horizontal support;
   a second upper horizontal support;
   a front stabilizing means connecting a front portion of said upper horizontal supports;
   a rear stabilizing means connecting a front portion of said upper horizontal supports;
   a front vertical support extending downwardly from a front corner of said carrier;
   a first rear vertical support extending downwardly from a first rear corner of said carrier;
   a second rear vertical support extending downwardly from a second rear corner of said carrier; and
   at least one tray support extending from said first rear vertical support to said front vertical support and to said second rear vertical support, said tray support adapted to detachably receive a product tray;
   wherein said product tray may be placed in said carrier in from the side of said carrier or from an oblique angle to said carrier.

7. The carrier of claim 6, further comprising:
   connecting means formed on said upper horizontal supports for detachably connecting said carrier to a lid of said fryer.

8. The carrier of claim 6, wherein said tray support has a rectangular shape.

9. The carrier of claim 6, wherein said tray support has a trapezoidal shape.

10. The carrier of claim 6, wherein said tray support has a triangular shape.

11. The carrier of claim 6, wherein said tray support further extends from said first rear vertical support to said second rear vertical support.

* * * * *